United States Patent [19]

Hanyuda et al.

[11] Patent Number: 5,071,929

[45] Date of Patent: Dec. 10, 1991

[54] THERMOSET RESIN COMPOSITION

[75] Inventors: Toshiaki Hanyuda; Kojiro Mori, both of Yokohama; Kazuo Ohtani, Kumagaya; Norio Shinohara, Isesaki; Jouji Shibata, Honjou, all of Japan

[73] Assignee: Showa Highpolymer Co., Ltd., Tokyo, Japan

[21] Appl. No.: 412,929

[22] Filed: Sep. 26, 1989

[30] Foreign Application Priority Data

Sep. 27, 1988 [JP] Japan .................................. 63-241231

[51] Int. Cl.$^5$ ..................... C08F 226/06; C08F 222/40
[52] U.S. Cl. ..................................... 526/262; 526/259; 526/280; 526/282
[58] Field of Search ................. 526/262, 259, 282, 280

[56] References Cited

U.S. PATENT DOCUMENTS 4,853,449  8/1989  Domeier .............................. 526/262
4,871,821 10/1989  Stenzenberger et al. ............ 526/262

Primary Examiner—Paul R. Michl
Assistant Examiner—T. McDonald, Jr.
Attorney, Agent, or Firm—Oblon, Spivak, McClelland, Maier & Neustadt

[57] ABSTRACT

A thermoset resin composition comprises a compound (A) having one or more maleimido groups in its molecule and at least one vinylbenzyl ether compound (B) selected from the group consisting of compounds ($B_1$) having at least two vinylbenzyl ether groups bonded to a naphthalene nucleus in its molecule and compounds ($B_2$) having at least two vinylbenzyl ether groups bonded to a benzene nucleus having at least one substituent selected from the group consisting of hydroxyl groups, alkyl groups and alkoxy groups in its molecule.

The composition exhibits excellent low-temperature curing properties, heat resistance and mechanical strength.

6 Claims, No Drawings

THERMOSET RESIN COMPOSITION

BACKGROUND OF THE INVENTION

The present invention relates to a thermoset polymaleimide resin composition. In particular, the present invention relates to a thermoset resin composition which exhibits excellent curing properties at low temperatures and produces hardened products having excellent heat resistance and mechanical properties.

Thermoset resins are widely used as adhesive, casting, painting, impregnating, laminating and molding compounds, in coating materials, insulating materials, composite structural materials and the like. However, thermoset resins have been recently used in various fields, and conventional thermoset resins are unsatisfactory in some environments of use and under some conditions of use. Conventional thermoset resins are particularly unsatisfactory for use at high temperatures, and there is thus a demand for development in this area.

Of thermoset resins, polyimide resins are one of the most excellent materials and are thus being developed in various aspects. For example, Japanese Patent Laid-Open No. 53319/1987 discloses a composition comprising a polymaleimide compound and a reactive oligomer having alkenyl ether groups at the terminals of its molecule. However, it is said that this resin composition is inferior to conventional resin such as epoxy based resin with respect to high curing temperature, long curing time, and workability involving these properties. This applies to the most typical composition comprising the combination of a bismaleimide and an aromatic amine or the combination of a bismaleimide, an aromatic amine and epoxy resin. There is therefore no resin composition exhibiting excellent heat resistance and mechanical physical properties, as well as excellent curing properties at low temperatures.

In consideration of the above-described situation, some of the inventors energetically investigated with a view to provide a polyimide resin composition having a low curing temperature and a short curing time, as well as exhibiting excellent heat resistance, heat stability and mechanical physical properties. As a result, they found and proposed that the formation of a composition containing maleimide compound, i.e., a thermoset resin composition comprising a maleimide compound and a compound of vinylbenzyl ether group bonded to an aromatic nucleus, which is represented by bisphenol divinylbenzyl ether, enables a reduction in the curing temperature and a significant reduction in the curing time, which are both curing properties (refer to Japanese Patent Laid-Open No. 65110/1989). However, such a composition has high viscosity and thus requires improvement.

As a result of further investigation, the inventors found that a thermoset polyimide resin composition having low working viscosity and excellent physical properties can be obtained by using a specific vinylbenzyl ether compound. This led to the achievement of the present invention.

SUMMARY OF THE INVENTION

The present invention provides a thermoset resin composition comprising a compound (A) having one or more maleimido groups in its molecule and at least one vinylbenzyl ether compound (B) selected from the group consisting of compounds ($B_1$) each having at least one vinylbenzyl ether groups which are bonded to the naphthalene nucleus in its molecule and compounds ($B_2$) each having in its molecule at least two vinylbenzyl ether groups which are bonded to the benzene nucleus having at least one substituent selected from the group consisting of hydroxyl groups, alkyl groups and alkoxy groups.

The present invention having the above-described configuration provides a thermoset composition which can be hardened at a relatively low temperature and designed so as to have low working viscosity, as well as exhibiting a short curing time, and which is capable of producing hardened products exhibiting excellent heat stability, mechanical physical properties and heat resistance.

DETAILED DESCRIPTION OF THE INVENTION

Each of the components of the composition of the present invention will be described below in detail.

Component A compound having maleimido groups

Examples of compounds that may be used as Compound A having maleimido groups include N,N'-phenylene bismaleimide, N,N'-xylene bismaleimide, N,N'-tolylene bismaleimide, N,N'-diphenylmethane bismaleimide, N,N'-diphenylether bismaleimide,-N,N'-diphenylsulfone bismaleimide, N,N'-diphenylmethane bismethylmaleimide,'N,N'-diphenylether bismethylmaleimide and N,N'-hydrogenated phenylmethane bismaleimide; amino-modified bismaleimide compounds which can be obtained by reacting 1 mole of the above-described bismaleimide compounds with less than 0.3 to 1 mole of diamino compounds such as diaminodiphenylmethane, diaminodiphenylsulfone or diaminodiphenyl ether and which still have maleimido groups; and compounds which are products of addition of epoxy resin-modified amino compounds to the above bismaleimide compounds and which still have maleimido groups. Examples of monofunctional maleimides include aromatic maleimides represented by phenyl maleimide, alkyl maleimides represented by lauryl maleimide, and alicyclic maleimides represented by cyclohexyl maleimide.

$B_1$

The compound ($B_1$) used in the present invention which has at least two vinylbenzyl ether groups bonded to the naphthalene nucleus in its molecule can be expressed by the following formula (I) or (II):

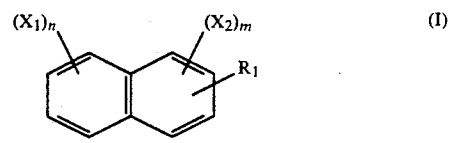

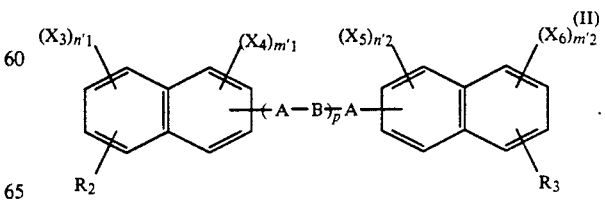

In the formulae (I) and (II), $X_1$, $X_2$, $X_3$, $X_4$, $X_5$ and $X_6$ each denote a vinylbenzyl ether group, i.e.,

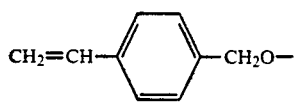

$R_1$, $R_2$ and $R_3$ each denote hydrogen or an alkyl group; n and m in the formula (I) each denote an integer satisfying the relational expression $8 \geq (n+m) \geq 2$ and $n_1'$ and $m_1'$ in the formula (II) each denote an integer satisfying the relational expression $7 \geq (n_1' + m_1') \geq 1$ ($n_2'$ and $m_2'$ each denotes the same); p denotes an integer of 0 to 5; A denotes a hydrocarbon bond having 1 to 7 carbon atoms; and B denotes benzene or naphthalene having a vinylbenzyl ether group.

These compounds can be easily synthesized from the dehydrochlorination reaction between a halomethyl styrene such as chloromethyl styrene and a polyhydroxy naphthalene such as 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 1,2,3-trihydroxynaphthalene, 1,2,4-trihydroxynaphthalene, 1,4,5-trihydroxynaphthalene, 1,2,3,4-tetrahydroxynaphthalene or 1,2,3,4,5,8-hexahydroxynaphthalene, novolak obtained by condensation of naphthol and formalin, or novolak obtained by condensation of naphthol and phenol formalin, using caustic potash or caustic soda and a solvent such as dimethyl sulfoxide or the like. A typical synthetic example is as follows:

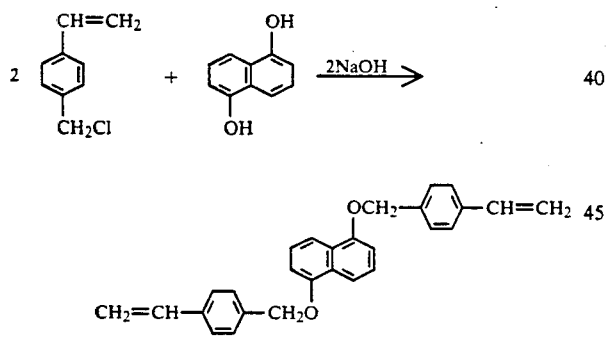

Component $B_2$

The compound ($B_2$) used in the present invention which has at least two vinylbenzyl ether groups bonded to the benzene nucleus having at least one type of substituents selected from the group consisting of hydroxy groups, alkyl groups and alkoxy groups in its molecule can be expressed by the following formula (III):

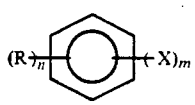

(III)

In the formula (III), X denotes a vinylbenzyl ether group, i.e.,

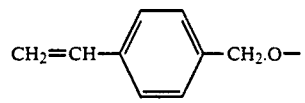

R denotes a hydroxyl group, an alkyl group having 1 to 8 carbon atoms or an alkoxy group, m denotes an integer satisfying the relational expression $6 > m \geq 2$, preferably 2 to 3, and n denotes an integer of 1 to 4. The compound expressed by the formula (III) can be easily synthesized by dehydrochlorination reaction between a polyvalent phenol having the above-described substituents and a halomethylstyrene such as chloromethylstyrene using caustic potash or caustic soda and a solvent such as alcohol, dioxane, dimethyl sulfoxide or the like. A typical example of the synthesis is as follows:

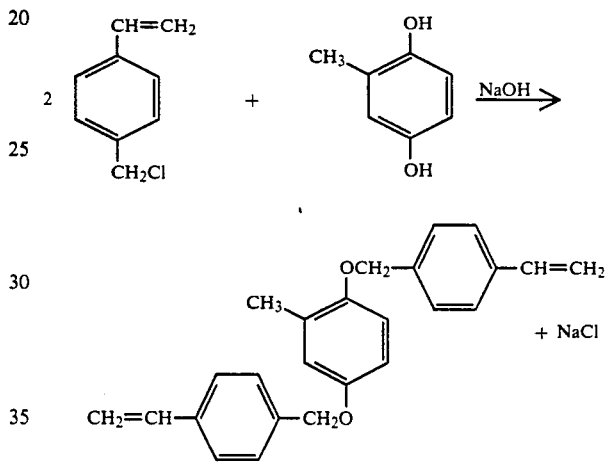

Typical examples of polyvalent phenols having the above-described substituents include 2,3-dioxytoluene, 3,4-dioxytoluene, 4-tert-butylcatechol cresorcine, orcine, β-orcine, m-xylorcine, 4-n-hexylresolcine, 2methylhydroquinone, tert-butylhydroquinone, 2,5-di-tertacylhydroquinone, 2,5-diethoxyhydroquinone, 2,3,6-trimethylhydroquinone, pyrogallol, pyrogallol-2-methyl ether, pyrogallol monoacetate, 1,3,5-trioxybenzene and the like.

Although the equivalent ratio between the maleimide compound (A) and the vinylbenzyl ether compound (B) in the composition of the present invention can be widely changed in accordance with the purpose of use, the equivalent ratio A/B of unsaturated groups in the compounds (A) and (B) is 100/30 to 1/100, preferably 100/50 to 1/30. Within these regions, the heat-curing reaction of the composition easily proceeds at a low temperature for a short time without a radical initiator, as compared with the heat curing of each component. In addition, within these regions, the starting temperature of the thermal decomposition of the composition in air is high, and the weight of the composition is not much reduced by decomposition.

The thermoset composition of the present invention can contain the above-described components (A) and (B), as well as another known monomer such as styrene, vinyltoluene, allylphenol, allyloxybenzene, diallylphthalate, an acrylate, a methacrylate, vinylpyrrolidone or the like, within the scope of the idea of the present invention. It is a matter of course that the composition can also contain a known compound such as hydroquinone, benzoquinone, a copper salt, a tetramethyl thiuram compound, a nitrosophenylhydroxyl compound or the like, which are all generally used for adjusting the curing reaction, and a radical initiator for promoting the curing reaction.

The thermoset composition of the present invention can be used as molding materials and composite materials by being compounded with other various fillers and reinforcing fibers using a kneader, blender, roll or the like; as varnish, coating materials and adhesives by being dissolved in solvents; and as molding materials and structural materials useful for prepreg and filament winding by impregnating reinforcing fibers such as glass fibers, carbon fibers, aromatic polyamide fibers, silicon carbide fibers, or alumina fibers with the composition.

Although the present invention will be described in detail below with reference to reference examples and examples, the present invention is not limited to the examples. The term "parts" in the examples represents "parts by weight" unless otherwise provided.

REFERENCE EXAMPLE 1

Synthesis of naphthalene divinylbenzyl ether by reaction of dihydroxynaphthalene with chloromethylstyrene 80 parts (1.0 equivalent) of 1,5-dihydroxynaphthalene and 56.1 parts (1.0 equivalent) of potassium hydroxide were dissolved in a mixture of 200 parts of dimethyl sulfoxide and 30 parts of water. To the resulting solution was then dropwisely added a solution obtained by dissolving 152.5 parts (1.0 equivalent) of commercial chloromethylstyrene and 0.1 part of hydroquinone in 100 parts of dimethyl sulfoxide at 70° C. over a time of 1 hour, followed by reaction at 70° C for 2 hours. A high excess of water was then added to the system, and water-dimethyl sulfoxide was then removed after agitation. The residue was then subjected to extraction with benzene to obtain an oily substance. The thus-obtained benzene layer was then washed with 5% caustic potash and then water until the pH value of the water layer became 7 and then dried with anhydrous sulfuric soda. The crude reaction product was solid to semi-solid with a yield after the removal of benzene of 98% and could be recrystallized from methanol or ethanol. The recrystallization product had a melting point of 87° to 89° C. and was soluble in benzene, toluene, methyl ethyl ketone, dioxane, hot ethanol and hot methanol (abbreviated as 1,5-NDVBE hereinafter).

Bis(vinylbenzyl ether) naphthalene was synthesized by using 2,6-dihydroxynaphthalene, 1,4-dihydroxynaphthalene or 1,6-dihydroxynaphthalene in place of 2,6-dihydroxynaphthalene by the same method as that described above (the products being respectively abbreviated as 2,6NDVBE, 1,4-NDVBE and 1,6-NDVBE).

EXAMPLE 1

Samples were prepared by mixing 1 equivalent of each of 1,5-NDVBE, 2,6-NDVBE, 1,4-NDVBE and 1,6-NDVBE, which were synthesized in REFERENCE EXAMPLE 1, with 1 equivalent of diphenylmethane bismaleimide (abbreviated as BMI hereinafter) manufactured by Mitsui Toatsu Co., Ltd. Each of the samples was placed on a hot plate at 120° C. and examined with respect to gelation. For the purpose of comparison, VBE and bismaleimide were examined by the same method as that described above. The results obtained are summarized in Table 1

TABLE 1

| | Gelatin time (120° C.) |
|---|---|
| 1,5-NDVBE/BMI | 2.8 minutes |
| 2,6-NDVBE/BMI | 4.6 minutes |
| 1,4-NDVBE/BMI | 2.2 minutes |
| 1,6-NDVBE/BMI | 2.4 minutes |
| (Comparison) | |
| BMI only | >60 minutes |
| Four corresponding VBE's | >60 minutes |

Each of the compositions was molded at 120° C. for 30 minutes and then hardened at 200° C. for 5 hours after the mold had been separated. The starting temperature of thermal decomposition in air and heat deformation temperature of each composition were measured in accordance with JIS K6911. The results are shown in Table 2.

TABLE 2

| | HDT[1] | Heat decomposition starting temperature[2] |
|---|---|---|
| 1,5-NDVBE/BMI | >300° C. | 440° C. |
| 2,6-NDVBE/BMI | >300° C. | 438° C. |
| 1,4-NDVBE/BMI | >300° C. | 415° C. |
| 1,6-NDVBE/BMI | >300° C. | 429° C. |

[1]Heat deformation temperature
[2]The temperature at which the weigh of each sample was reduced by 5% by heating at a rate of 20° C./minute.

EXAMPLE 2

A piece of plain cloth WF-350 manufactured by Nihon Boseki Co., Ltd. was impregnated (GC 56%) with a mixture of 1,5-NDVBE and BMI in an equivalent ratio of 1 : 1 and then hardened after being allowed to stand at 150° C. for 2 hours and at 200° C. for 5 hours. The flexural strength and flexural modulus of the test piece at room temperature based on JIS-7055 was 33 kg/mm$_2$ and 1360 kg/mm$_2$, respectively. The influence of temperature at 200° C. and 220° C. on the flexural strength, flexural modulus are shown in Table 3.

TABLE 3

| Retention of flexural properties of 1,5-NDVBE/BMI (1/1) | | |
|---|---|---|
| | 200° C. | 220° C. |
| Flexural strength | 75% | 57% |
| Flexural modulus | 80% | 71% |

The flexural strength and the flexural modulus based on JIS K-6911 of a cast hardened product having this composition were 11 kg/mm$_2$ and 354 kg/mm$_2$, respectively, and the value of Barcol hardness thereof was as high as 52.

The flexural strength, flexural modulus and strength retention at elevated temperature testing are shown in Table 4.

TABLE 4

| | | Strength (kg/mm$^2$) | Retention (%) |
|---|---|---|---|
| 200° C. | Flexural strength | 6.1 | 55 |
| | Flexural modulus | 220 | 62 |
| 220° C. | Flexural strength | 6.0 | 54 |
| | Flexural modulus | 198 | 56 |

COMPARATIVE EXAMPLE 1

The tests of a cast hardened product were performed by the same method as that employed in EXAMPLE 2 with the exception that bisphenol A divinylbenzyl ether was used in place of 1,5-NDVBE used in EXAMPLE 2. The product exhibited a heat deformation temperature of 273° C., Barcol hardness of 52, flexural strength of 10.1 kg/mm² and flexural modulus of 436 kg/mm². The hot flexural strength, hot flexural modulus and strength retention at 200° C. and 20° C. are shown in Table 5.

TABLE 5

|  |  | Strength (kg/mm²) | Retention (%) |
| --- | --- | --- | --- |
| 200° C. | Flexural strength | 4.8 | 48 |
|  | Flexural modulus | 195 | 45 |
| 220° C. | Flexural strength | 4.6 | 46 |
|  | Flexural modulus | 175 | 40 |

REFERENCE EXAMPLE 2

358 parts (1 mole) of diphenylmethane bismaleimide was dissolved in a solvent mixture of 3150 parts of dioxane and 2100 parts dichloromethane, and 158.4 parts (0.8 mole) of diaminodiphenylmethane was then charged in the thus-obtained solution, followed by reaction at room temperature for 5 hours and then at 50° C. for 4 hours. The solvent was then removed by an evaporator under reduced pressure to obtain amino-modified bismaleimide.

EXAMPLE 3

40 parts of 1,5-naphthalene divinylbenzyl ether, which was synthesized by the same method as that in REFERENCE EXAMPLE 1, and 36 parts of diaminodiphenylmethane (0.8 mole)-modified bismaleimide, which was synthesized in REFERENCE EXAMPLE 2, were mixed and dissolved at 100° C. The thus-formed solution was then charged into a space between two glass plates with a rubber spacer and then hardened at 120 C for 1 hour. After curing, the glass plates were removed, followed by curing at 180° C. for 2 hours and then at 220° C. for 6 hours. The physical properties described below were then measured in accordance with JIS-K6911. The results obtained are shown in Table 6.

TABLE 6

| Physical properties | Unit | Example 3 |
| --- | --- | --- |
| Barcol hardness (934-1) | — | 52 |
| Heat deformation temperature | °C. | 275 |
| Flexural strength | kg/mm² | 14 |
| Flexural modulus | kg/mm² | 410 |
| Tensile strength | kg/mm² | 7.8 |
| Tensile modulus | kg/mm² | 390 |
| Breaking extension | % | 3.3 |

REFERENCE EXAMPLE 3

Synthesis of tert-butylhydroquinone divinylbenzyl ether by reaction of tert-butylhydroquinone with chloromethylstyrene 83 parts (1.0 equivalent) of tert-butylhydroquinone and 56.1 parts (1.0 equivalent) of potassium hydroxide were dissolved in a mixture of 120 parts of dimethyl sulfoxide and 30 parts or water. To the thus-obtained solution was then dropwisely added to a solution obtained by dissolving 152.5 parts (1.0 equivalent) of commercial chloromethylstyrene in 50 parts of dimethyl sulfoxide at 70° C. over a period of 1 hour. The thus-obtained mixture was then subjected to reaction at 70° C. for 2 hours. An excess of water was then added to the system, and water-dimethyl sulfoxide was then removed after agitation. The residue was then subjected to extraction with benzene to obtain an oily substance. The obtained benzene layer was then washed with 5% caustic potash solution and then water until the pH value of the water layer became 7 and was then dried with anhydrous sulfuric soda. The reaction product was an oily substance with a yield of 98% after the removal of benzene and was soluble in various organic solvents (abbreviated as tert-BHQDVBE hereinafter).

Divinylbenzyl ethers each having a benzene skeleton were synthesized by the same method as that described above with the exception that hydroquinone, 2-methylhydroquinone, 2,3,6-trimethylhydroquinone and 4-tert-butylcatechol were used in place of tert-butylhydroquinone (abbreviated as HQDVBE, MHQDVBE, TMHQDVBE and tert-BCDVBE respectively hereafter). The properties of the divinylbenzyl ethers each having a benzene skeleton are shown in Table 7.

TABLE 7

|  |  | Melting point (°C.) | Viscosity (ps, 25° C.) |
| --- | --- | --- | --- |
| ter-BHQDVBE | Oily | — | 42 |
| HQDVBE | Crystalline | 90 | — |
| MHQDVBE | Oily | — | 23 |
| TMHQDVBE | Solid | 60–80 | — |
| ter-BCDVBE | Oily | — | 17 |

As can be seen from Table 7, the hydroquinone divinylbenzyl ether (HQDVBE) disclosed in Japanese Patent Laid-Open No. 65110/1989 has a melting point of 90° C. and thus is easily crystallized and exhibits poor workability. However, the divinylbenzyl ether compounds of the present invention which have substituents are not crystallized and exhibit low viscosity and good workability.

REFERENCE EXAMPLE 4

Synthesis of diaminodiphenylmethane-modified bismaleimide by reaction of bismaleimide with diaminodiphenylmethane 358 parts (1.0 mole) of N,N'-diphenylmethane bismaleimide and 99 parts (0.5 mole) of diaminodiphenylmethane were sufficiently ground and mixed. The thus-obtained mixture was then melt-agitated for 10 minutes in a vessel at 170° C., and immediately water-cooled to obtain a solid substance. The solid reaction product was soluble in solvents such as N-methyl pyrrolidone, dimethylformamide and the like, as well as low-boiling point solvents such as acetone, methyl ethyl ketone and the like (abbreviated as DDM-modified BMI hereinafter).

EXAMPLE 4

Samples were prepared by mixing 1 equivalent of each of ter-BHQDVBE, MHQDVBE, ter-BCDVBE, which were synthesized in REFERENCE EXAMPLE 3, with 1 equivalent of diphenylmethane bismaleimide (abbreviated as BMI) produced by Mitsui Toatsu Co., Ltd. Each of the samples was placed on a hot plate at 120° C. and measured with respect to gelation. For the purpose of comparison, VBE and BMI were tested by the same method as that described above. The results obtained are summarized in Table 8.

TABLE 8

|  | Gelation time (120° C.) |
|---|---|
| ter-BHQDVBE/BMI | 2.0 minutes |
| MHQDVBE/BMI | 2.8 minutes |
| ter-BCDVBE/BMI (Comparison) | 2.9 minutes |
| BMI only | >60 minutes |
| Four corresponding VBE's | >60 minutes |

EXAMPLE 5

Samples obtained by mixing 1.0 equivalent of BMI with each of ter-BHQDVBE, MHQDVBE and ter-BCDVBE and samples obtained by mixing 1.0 equivalent by theoretical equivalent of DDM-modified BMI, which was synthesized in REFERENCE EXAMPLE 4, therewith were respectively molded at 120° C. for 30 minutes. After each mold had been removed, each of the samples was hardened at 250° C. for 5 hours. The starting temperature of thermal decomposition of each of the hardened products in air and the flexural strength, flexural modulus thereof at room temperature and high temperatures were measured in accordance with JIS K-6911. The results obtained are shown in Tables 9 and 10.

TABLE 9

|  | Starting temperature of thermal decomposition (°C.)* | |
|---|---|---|
|  | BMI | DDM-modified BMI |
| ter-BHQDVBE | 401 | 406 |
| MHQDVBE | 440 | 416 |
| ter-BCDVBE | 400 | 403 |

*Temperature at which the weight of each sample was reduced by 5% during heating at a rate of 20° C./minute.

TABLE 10

|  |  | ter-BHODVBE | | HMODVBE | | ter-BCDVBE | |
|---|---|---|---|---|---|---|---|
|  |  | BMI | DDM-BMI* | BMI | DDM-BMI* | BMI | DDM-BMI* |
| 23° C. | Flexural strength (kg/mm$^2$) | 9.2 | 9.1 | 10.5 | 11.1 | 8.9 | 9.6 |
|  | Flexural modulus (kg/mm$^2$) | 424 | 479 | 414 | 475 | 443 | 487 |
| 200° C. | Flexural strength (kg/mm$^2$) | 6.5 | 7.4 | 6.4 | 7.0 | 4.9 | 4.9 |
|  | (Retention %) | (71) | (81) | (61) | (63) | (55) | (51) |
|  | Flexural modulus (kg/mm$^2$) | 271 | 266 | 344 | 328 | 273 | 231 |
|  | (Retention %) | (64) | (56) | (83) | (69) | (62) | (48) |
| 250° C. | Flexural strength (kg/mm$^2$) | 5.3 | 3.7 | 7.4 | 7.4 | 4.1 | 1.9 |
|  | (Retention %) | (58) | (41) | (70) | (67) | (46) | (20) |
|  | Flexural modulus (kg/mm$^2$) | 170 | 158 | 236 | 266 | 189 | 82 |
|  | (Retention %) | (40) | (33) | (57) | (56) | (43) | (17) |
| 270° C. | Flexural strength (kg/mm$^2$) | 2.4 | 1.8 | 5.5 | 5.0 | 2.1 |  |
|  | (Retention %) | (26) | (20) | (52) | (45) | (24) |  |
|  | Flexural modulus (kg/mm$^2$) | 87 | 67 | 182 | 185 | 80 |  |
|  | (Retention %) | (20) | (14) | (44) | (39) | (18) |  |

*DDM-modified BMI

EXAMPLE 6

A sample obtained by mixing 10 parts of phenylmaleimide (PMI) with 100 parts of MHQDVBE and a sample obtained by mixing 20 parts of PMI therewith were molded at 120° C. for 1 hour After the molds had been removed, the samples were then hardened at 250° C. for 5 hours. The starting temperature of thermal decomposition in air and the flexural strength and flexural modulus at room temperature and high temperatures based on JIS K-6911 were measured. The results obtained are shown in Table 11.

TABLE 11

|  |  | MHODVBE (100 parts) | |
|---|---|---|---|
|  |  | PMI (10 parts) | PMI (20 parts) |
| Starting temperature of thermal decomposition (°C.) | | 412 | 406 |
| 23° C. | Flexural strength (kg/mm$^2$) | 9.6 | 12.2 |
|  | Flexural modulus (kg/mm$^2$) | 492 | 505 |
| 200° C. | Flexural strength (kg/mm$^2$) | 6.3 | 6.9 |
|  | (Retention %) | (66) | (57) |
|  | Flexural modulus (kg/mm$^2$) | 290 | 313 |
|  | (Retention %) | (59) | (62) |
| 250° C. | Flexural strength (kg/mm$^2$) | 4.5 | 4.6 |
|  | (Retention %) | (47) | (33) |
|  | Flexural modulus (kg/mm$^2$) | 173 | 166 |
|  | (Retention %) | (35) | (33) |
| 270° C. | Flexural strength (kg/mm$^2$) | 2.6 | 2.3 |
|  | (Retention %) | (27) | (19) |
|  | Flexural modulus (kg/mm$^2$) | 129 | 110 |
|  | (Retention %) | (26) | (22) |

EXAMPLE 7

80 parts of Compimide 353 manufactured by Technohemi Co., Ltd., which comprises 85% aromatic maleimide and 15% of aliphatic maleimide, was mixed with 100 parts of 1,5-napthalene naphthalene divinylbenzyl ether and then agitated under heating at 80° C. so that the viscosity was 12 poise/80° C. Glass roving (SX$_{220}$PE-985ESI, produced by Nitto Boseki Co., Ltd. was then impregnated with the thus-formed resin solution at 80° C. and then subjected to filament winding in one direction n a plate formed mandrel. After press molding had been performed at 160° C. for 1 hour, the mold was removed, and curing was then performed at 200° C. for 5 hours and then at 25u° C. for 5 hours to form a specimen. No micro-cracks were found in the specimen when observed by microscope at 20 power.

The flexural strength and flexural modulus of the specimen at room temperature and high temperatures were measured in accordance with JIS K-6911. The results obtained are shown in Table 12.

COMPARATIVE EXAMPLE 2

Net filament winding of heat resistant epoxy resin and hot flexural strength of molded product 80 parts o±methyl nadic anhydride and 1 part of trisdimethylaminomethylphenol were added to 100 parts of novolak-type epoxy resin DEN 438 manufactured by Dow Chemical Co. of the U.S. and then well agitated under heating at 50° C. to form a resin solution with viscosity of 0.5 poise/50° C. Glass roving (SX$_{220}$ PE-985ESI, produced by Toyo Boseki Co., Ltd.) was impregnated with the thus-formed resin solution at 50° C. and then subjected to filament winding in one direction on a plate-formed mandrel. After press molding had been performed at 150° C. for 1 hour, the mold was removed, and curing was carried out at 200° C. for 10 hours to form a specimen. The flexural strength and flexural modulus of the specimen at room temperature and high temperatures were measured in accordance with JIS K-6911. The results obtained are shown in Table 12.

TABLE 12

| | EXAMPLE 7 | COMPARATIVE EXAMPLE 2 |
|---|---|---|
| Type of fiber material | Unidirectional glass | Unidirectional glass |
| Content of fiber material (wt %) | 60 | 60 |
| 23° C. Flexural strength (kg/mm$^2$) | 81 | 87 |
| Flexural modulus (kg/mm$^2$) | 2800 | 2960 |
| 150° C. Flexural strength (kg/mm$^2$) | 79 | 74 |
| (Retention %) | (98) | (85) |
| Flexural modulus (kg/mm$^2$) | 2690 | 2550 |
| (Retention %) | (96) | (86) |
| 200° C. Flexural strength (kg/mm$^2$) | 61 | 58 |
| (Retention %) | (75) | (48) |
| Flexural modulus (Kg/mm$^2$) | 2550 | 1600 |
| (Retention %) | (91) | (54) |
| 250° C. Flexural strength (kg/mm$^2$) | 47 | 10 |
| (Retention %) | (58) | (11) |
| Flexural modulus (Kg/mm$^2$) | 2040 | 500 |
| (Retention %) | (73) | (17) |

EXAMPLE 8

100 parts of 1,4-NDVBE and 100 parts of DDM-modified BMI were dissolved in 200 parts of acetone to form a solution having a viscosity of 0.5 poise/25° C.

A piece of glass cloth WEA18K105BZ2 (produced by Toyo Boseki Co., Ltd.) was impregnated with the thus-formed resin solution and then dried at 80° C. for 5 minutes and then at 120° C. for 10 minutes so as to be put into the B-stage to form a prepreg of 300 g/m$_2$ without any surface adhesion.

The volatile content (calculated from the difference of the weight before and after heating at 150° C. for 20 minutes) of the prepreg was 0.2 to 0.4%.

10 plys of the prepreg were then placed on a sheet of 35 μm thick copper foil (3EC, produced by Mitsui Mining & Smelting Co., Ltd.) and then subjected to press molding under heating at 175° C. for 30 minutes (40 Kg/cm$^2$) to obtain a laminate covered with copper having a thickness of 1.6 mm and containing 61% glass fiber.

The characteristics of the thus-formed laminate covered with copper are shown in Table 13.

EXAMPLE 9

100 parts of MHQDVBE and 100 parts of DDM-modified BMI were dissolved in 200 parts of acetone to form a solution having a viscosity of 0.4 poise/25° C.

A piece of carbon cloth (#6343, produced by Toray Industries, Inc.) of 200 g/m$^2$ was impregnated with the thus-formed resin solution and then dried at 80° C. for 10 minutes to obtain a prepreg of 285 g/m$^2$ having surface adhesion.

20 plys of the prepreg were subjected to press molding under heating (at 175° C. for 30 minutes) and then to after curing at 250° for 5 hours to form a laminate having a thickness of 3.0 mm.

The hot flexural strength of the laminate is shown in Table 14.

TABLE 13

| Item | | Unit | Test method | EXAMPLE 8 |
|---|---|---|---|---|
| Insulation resistance | Normal | Ω | JIS C6484 | 5 × 10$^{14}$ |
| | Boiling for 2 hours | Ω | " | 6 × 10$^{12}$ |
| Dielectric constant (1 MHz) | | — | " | 4.3 |
| Dielectric loss tangent (1 MHz) | | — | " | 5 × 10$^{-3}$ |
| Solder heat resistance | 260° C. | sec | " | 120 or more |
| | 300° C. | sec | " | 120 or more |
| Peel off strength | 23° C. | kgf/cm | " | 1.5 |
| | After soldering (260° C., 60 sec) | kgf/cm | " | 1.5 |
| Heat resistance | 200° C., 2 Hr | — | (Note) | Normal |
| | 250° C., 2 Hr | — | (Note) | " |
| | 300° C., 2 Hr | — | (Note) | " |

(Note) The appearance (expansion, peeling and cracking) of the laminate covered with copper was observed after treatment in an oven at 200° C., 250° C. and 300° C. for 2 hours.

TABLE 14

| | | kgf/mm$^2$ | Retention % |
|---|---|---|---|
| 23° C. | Flexural strength | 61.5 | |
| | Flexural modulus | 4800 | |
| 150° C. | Flexural strength | 59.3 | 96 |
| | Flexural modulus | 5090 | 106 |
| 200° C. | Flexural strength | 54.3 | 88 |
| | Flexural modulus | 4800 | 100 |
| 220° C. | Flexural strength | 52.5 | 85 |
| | Flexural modulus | 4780 | 100 |
| 250° C. | Flexural strength | 43.7 | 71 |
| | Flexural modulus | 4780 | 100 |
| 300° C. | Flexural strength | 35.1 | 57 |
| | Flexural modulus | 4330 | 90 |

The measurements were performed in accordance with JIS K6911.

The thermoset resin composition of the present invention having the above-mentioned configuration has good workability because it is amorphous and has low viscosity and thus exhibits excellent low temperature curing, heat resistances and mechanical strength. The thermoset resin compositions can thus be widely utilized in industrial fields, for example, as adhesive, casting, coating, impregnating or laminating and molding compounds or as coating materials, insulating materials or composite structural materials.

What is claimed is:

1. A thermoset resin composition comprising a compound (A) having one or more maleimido groups in its molecule and at least one vinylbenzyl ether compound (B) selected from the group consisting of compounds (B$_1$) having at least two vinylbenzyl ether groups bonded to a naphthalene nucleus in its molecule and compounds (B$_2$) having at least two vinylbenzyl ether groups bonded to a benzene nucleus having at least one substituent selected from the group consisting of hydroxyl groups, alkyl groups and alkoxy groups in its molecule.

2. The thermoset resin composition according to claim 1, wherein said vinylbenzyl ether (B) is a compound (B$_1$) having one or more vinylbenzyl ether groups bonded to a naphthalene nucleus in its molecule.

3. The thermoset resin composition according to claim 1, wherein said vinylbenzyl ether (B) is a compound (B$_2$) having at least two vinylbenzyl ether groups bonded to a benzene nucleus having at least one substituent selected from the group consisting of hydroxyl groups, alkyl groups and alkoxy groups.

4. The composition according to claim 1, wherein the equivalent ratio A/B of unsaturation of said component (A) to said component (B) is 100/30 to 1/100.

5. The composition according to claim 4, wherein said equivalent ratio A/B of unsaturation of said component (A) to said component (B) is 100/50 to 1/30.

6. The composition according to any one of claims 1 to 5 further comprising a known monomer which is copolymerizable with said component (A) and said component (B).

* * * * *